THERMOELECTRIC GENERATORS

Filed Oct. 10, 1958

INVENTOR
W. P. MASON
BY
H. O. Wright
ATTORNEY

United States Patent Office 3,149,246
Patented Sept. 15, 1964

3,149,246
THERMOELECTRIC GENERATORS

Warren P. Mason, West Orange, N.J., assignor to Bell Telephone Laboratories, Incorporated, New York, N.Y., a corporation of New York Filed Oct. 10, 1958, Ser. No. 766,574
9 Claims. (Cl. 310—4)

This invention relates to arrangements for converting thermal energy into electrical energy.

Accordingly, a principal object of the invention is to facilitate the conversion of thermal energy into electrical energy.

Another object is to facilitate the conversion of the energy of the sun's rays into electrical energy.

The present invention utilizes a phenomenon associated with ferroelectric and ferromagnetic materials.

Since in cooling such materials from above their respective Curie temperatures to a temperature less than the Curie temperature a sudden spontaneous polarization takes place and in heating such materials from a temperature a few degrees below the Curie temperature to a temperature a few degrees above it a sudden spontaneous depolarization takes place, it is only necessary to provide suitable heating and cooling means together with an appropriate electrical coupling between an element of such a material and a utilization or load circuit to employ the phenomenon to provide useful electrical energy.

A preferred element for use in arrangements of the invention is a single domain crystal of a ferroelectric material having unidirectional polarization so that the problem of obtaining a suitable electrical coupling to the element will be relatively simple.

In accordance with a further feature of the invention, the Curie temperature of a number of the materials employed can be readily adjusted to a convenient value by adding minor percentages of other materials to the material of which a specific element is principally composed. By way of specific example, a minor percentage of strontium titanate added to an element consisting principally of barium titanate will very markedly lower the Curie temperature of the mixture with respect to the Curie temperature of an element consisting solely of barium titanate.

The principles, objects and advantages of the invention will become more clearly apparent from a perusal of the following detailed description of the specific illustrative embodiments shown in the accompanying drawing and from the appended claims.

Figure 1:
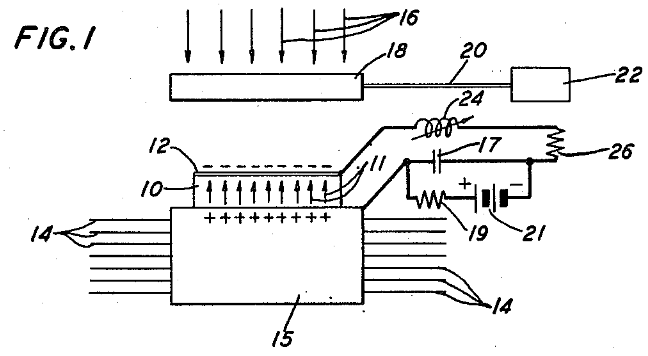
FIG. 1 illustrates in diagrammatic form one specific embodiment of the invention.

In more detail in FIG. 1, element 10 is, by way of specific example, a single domain crystal of barium titanate having a spontaneous polarization at temperatures below its Curie temperature directed as indicated by the arrows 11. The Curie temperature of barium titanate is 120 degrees centigrade.

Block 15 having heat radiating fins 14 supports element 10 and in addition serves both as the lower electrically conductive electrode for element 10 and as a means to rapidly cool element 10 by absorbing heat from it. Block 15 and its fins 14 should be of a material such as copper or brass having high heat conductivity. Element 10 is provided with a thin conductive coating 12 on its uppermost surface to serve as the other electrically conductive electrode for element 10.

Arrows 16 represent heat rays from a source of heat such as the sun. A shutter 18 is interposed in the path of rays 16 and is alternately opened and closed at intervals determined by the time required for rays 16 to raise the temperature of element 10 above its Curie temperature and the length of time required with shutter 18 closed for heat absorbing and radiating block 15 to cool element 10 to a temperature below its Curie temperature. Mechanism 22 operates the shutter 18 through coupling rod 20 and includes means for adjusting the timing of its operations to correspond to the optimum values for the above-mentioned heating and cooling intervals for element 10. Any of numerous devices and arrangements long known and widely used in the art can be employed to perform the functions described for mechanism 22 and shutter 18.

Electrode 12 is preferably connected through an inductance 24 to a utilization device represented by resistor 26, the other terminal of which is connected to block 15. Inductance 24 for normal use is adjusted to be resonant with the capacity of element 10 at the frequency at which the device is being operated. This frequency can conveniently be sixty cycles per second, by way of a specific example. The operation of the arrangement illustrated in the drawing and just described above is as follows. When heat rays 16 are permitted to impinge upon element 10 by the opening of shutter 18, the temperature of element 10 is raised a few degrees, for example, 8 to 10 degrees centigrade, above its Curie temperature. When this happens, the polarization represented by arrows 11 disappears and the charges represented by the positive signs beneath and the negative signs above element 10 that were held apart by the polarization flow through the circuit, including utilization device 26, and deliver power to it. When the heat rays 16 are cut off by closing shutter 18, the element 10 cools rapidly by conduction to block 15 and in dropping its temperature below its Curie temperature, element 10 again becomes spontaneously polarized, re-establishing the positive and negative charges below and above element 10, as illustrated in the drawing, thus causing a second surge of power in the opposite direction through the circuit including load or utilization device 26. The battery 21 is preferably provided to make certain that the polarization induced by cooling the element below its Curie temperature (represented by arrows 11) of element 10 will be in one direction as shown. Its voltage should be at least 500 volts per centimeter of thickness of element 10. A large resistance 19 of, for example, one half to one megohm is placed in series with battery 21 to prevent any appreciable power being drawn from the battery. A capacitance 17 having a large value, for example several microfarads, is shunted across the series combination of battery 21 and resistance 19 to effectively by-pass the combination insofar as the surges of energy from element 10 to utilization device 26 are concerned. The inductance 24 tends to render the power sinusoidal in character and by suitably proportioning the element and the heating and cooling intervals and instrumentalities, a sixty cycle alternating current, by way of specific example, can be readily supplied to utilization device 26. Alternatively, inductance 24 can be omitted, in which case a series of sharp pulses will be obtained and a wave rich in harmonic frequencies will be generated.

As taught in the Encyclopedia of Physics, published by Springer Verlag, Berlin, Germany, 1956, volume XVII, entitled "Dielectrics," the addition of a minor percentage of strontium titanate to barium titanate has the effect of lowering the Curie temperature of the mixture considerably so that arrangements of the invention such as the illustrative embodiment shown in the drawing can operate over a much lower temperature range than if element 10 is of substantially pure barium titanate. By way of specific example, if element 10 is a single crystal of a mixture comprising twenty percent strontium titanate, the balance being barium titanate, its Curie temperature will be 45 degrees centigrade instead of 120 degrees centigrade as for an element consisting of barium titanate only.

Other ferroelectric materials of which element 10 can be made are, by way of specific examples, potassium niobate ($KNbO_3$), mixtures of potassium and sodium niobates $(Na_6+K_5)NbO_3$, lead titanate zirconate $$(Pb)(Ti_{47}, Zr_{53})O_3$$

and lead titanate ($PbTiO_3$).

Obviously, a plurality of devices of the invention can be operated in series or in parallel if care is taken to see that they all are interconnected so that their output pulses are in phase. Also, obviously, lenses can be employed to focus a greater concentration of heat rays on each ferroelectric element.

Since the spontaneous polarization occurring as the element is cooled below its Curie temperature increases as the temperature of the element is still further lowered, it is desirable to cool element 10 to as low a temperature as can conveniently be done, bearing in mind the timing requirements of the overall arrangement.

Figure 2:
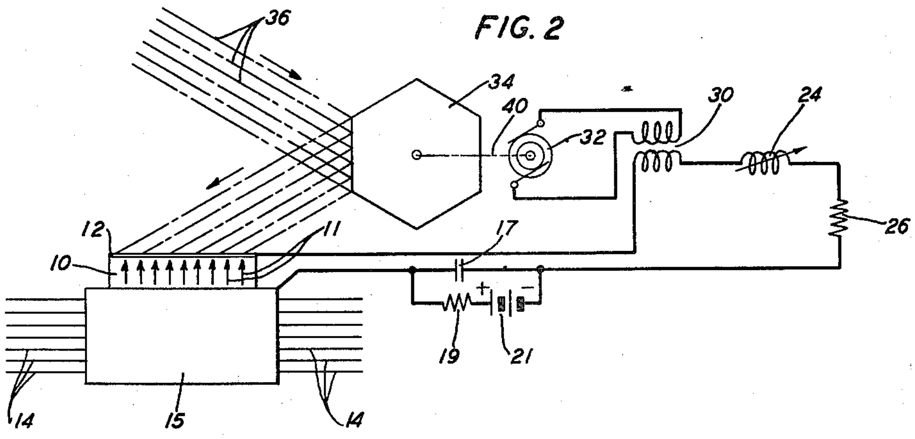
FIG. 2 illustrates a second specific embodiment of the invention.

In FIG. 2, element 10, electrode 12, block 15 with fins 14, load 26, capacitance 17, resistor 19, battery 21, and inductance coil 24 all can be as described above in connection with FIG. 1.

The embodiment of FIG. 2, of course, differs from that of FIG. 1 in that the shutter 18, mechanism 22 and coupling rod 20 are replaced by rotatable hexagonal mirror 34, selsyn motor 32, and transformer 30.

Rays 36 from a heat source such for example as the sun are for any of six appropriate rotational positions of hexagonal mirror 34 directed by the mirror to impinge on the upper surface of element 10 to raise its temperature above its Curie temperature. Selsyn motor 32 is connected through transformer 30 into the electrical output circuit comprising load 26 and inductance coil 24 which in turn is connected to the coupling means of element 10, e.g. electrode 12 and block 15.

At the peak of each surge of energy through the primary of transformer 30, the selsyn motor turns shaft 40 which is common to the motor 32 and mirror 34 through one half the angle necessary to bring the next flat of mirror 34 into the position in which it will direct rays 36 to impinge upon element 10. In other words, each energy pulse causes motor 32 to turn through an angle of 30 degrees. Thus the arrangement shown in FIG. 2 steps mirror 34 alternately between positions in which rays 36 are directed upon element 10 and positions in which rays 36 are directed so as not to impinge upon element 10. This alternately heats and cools element 10 substantially as described for FIG. 1 for the alternate opening and closing of the shutter employed in FIG. 1 and the overall effect is to supply alternating current energy to load 26 substantially as for the arrangement of FIG. 1.

Figure 3:
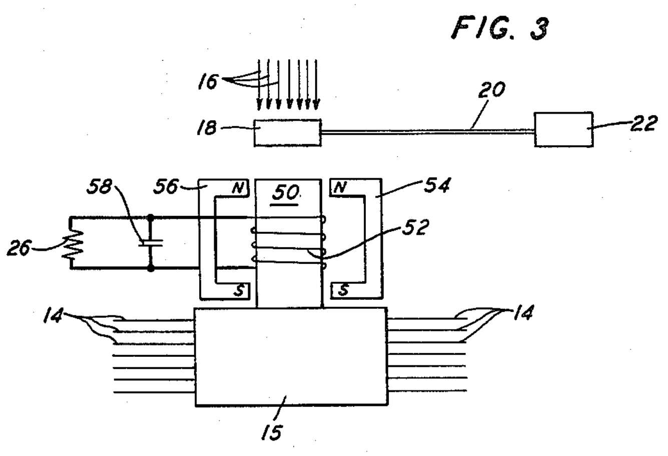
FIG. 3 illustrates a third specific embodiment of the invention.

FIG. 3 diagrammatically illustrates the application of the principles of the invention to an arrangement which employs an element of a ferromagnetic material instead of one of ferroelectric material as employed above in the arrangements of FIGS. 1 and 2.

In FIG. 3, element 50 is a member of a ferromagnetic material such as nickel, for example. Electrical coupling to element 50 is afforded by a coil or winding 52 of insulated copper wire encircling element 50. Permanent magnets 54 and 56 are provided to line up the polarizations of all domains within the element 50 in the same direction. The remaining portions of the arrangement of FIG. 3 except for capacitor 58 described below can be substantially the same as for those illustrated by FIGS. 1 and 2. That is, element 50 is in intimate contact with a heat absorbing base member 15 having heat radiating fins 14. A shutter 18 is interposed between a source of heat rays 16 such, for example, as the sun. Mechanism

22 is connected to shutter 18 by rod 20 and serves to alternately open and close shutter 18 for appropriate intervals so that when open, element 50 is heated to a temperature a few degrees above its Curie temperature and when shutter 18 is closed, element 50 is cooled to a few degrees below its Curie temperature.

The inductance of winding 52 makes unnecessary the provision of a separate inductance in the utilization circuit (such as inductance 24 of FIGS. 1 and 2) but a capacitor 58 may be shunted across winding 52 to constitute a combination resonant at the operating frequency. Again, resistor 26 represents a utilization device for the energy generated in winding 52 by the alternate polarization and depolarization of element 50 as it is varied in temperature as above described.

Numerous and varied other arrangements and modifications of the illustrative species and related structures can readily be devised by those skilled in the art within the spirit and scope of the principles of the present invention. For example, many other forms of arrangements employing sundry means for alternately heating and cooling the ferroelectric and ferromagnetic members can be readily devised. No attempt has here been made to illustrate all such arrangements and modifications.

What is claimed is:

1. A thermoelectric generator comprising an element of a material selected from the class consisting of barium titanate, a mixture of barium and strontium titanates, potassium niobate, a mixture of sodium and potassium niobates, lead titanate zirconate, and lead titanate, the material having a Curie temperature at which a transition from a polarized to an unpolarized state and vice versa takes place as the temperature of the element is varied alternately in opposite directions through a range including the Curie temperature, means for abstracting heat from the element, electrical coupling means for establishing an electrical coupling to the element, a utilization circuit electrically connected to the electrical coupling means, and means for intermittently applying heat to the element sufficient to raise the temperature of the element above its Curie temperature during periods of heat application and insufficient to maintain the element above its Curie temperature during the interval between successive heat application periods, whereby electrical energy is generated in the coupling means for utilization in the utilization circuit.

2. The generator of claim 1 in which the element is of barium titanate.

3. The generator of claim 2 and an inductance included in series with the electrical coupling means.

4. The generator of claim 1 in which the element is principally of barium titanate but includes approximately twenty percent of strontium titanate.

5. Apparatus for generating electrical energy from the rays of the sun comprising an element of a ferroelectric material selected from the class consisting of barium titanate, a mixture of barium and strontium titanates, potassium niobate, a mixture of sodium and potassium niobates, lead titanate zirconate, and lead titanate, the material having a Curie temperature at which a transition from a polarized to an unpolarized state and vice versa takes place, means for electrically coupling a utilization circuit to the element, a heat absorbing means in close heat conducting relation to the element, and means for intermittently subjecting the element to the rays of the sun for a period sufficient to raise the temperature of the element above its Curie temperature, the interval between successive applications of the sun's rays being sufficient for the heat absorbing means to reduce the temperature of the element to a temperature below the Curie temperature of the element whereby electrical energy is introduced into the utilization circuit through the coupling means.

6. The apparatus of claim 5 in which the element is of barium titanate.

7. The apparatus of claim 5 in which the element is principally of barium titanate but includes approximately twenty percent of strontium titanate.

8. The apparatus of claim 5 and an inductance included in series with the electrical coupling means.

9. The generator of claim 1, the circuit coupled to the element by the electrical coupling means including a direct current voltage biasing means whereby repolarization of the element occurring upon cooling from above to below the Curie temperature will always be polarized in the specific direction determined by the polarity of the bias voltage.

References Cited in the file of this patent

UNITED STATES PATENTS

| | | |
|---|---|---|
| 2,299,260 | Sivian | Oct. 20, 1942 |
| 2,919,358 | Marrison | Dec. 29, 1959 |

FOREIGN PATENTS

| | | |
|---|---|---|
| 707,651 | Great Britain | Apr. 21, 1954 |

OTHER REFERENCES

"Thermomagnetic Generator," L. Brillouin and H. P. Iskenderian.